(12) United States Patent  
Thurfjell et al.

(10) Patent No.: US 9,252,894 B2  
(45) Date of Patent: Feb. 2, 2016

(54) METHOD AND ARRANGEMENT FOR SUPPORTING CALIBRATION OF CORRELATED ANTENNAS

(75) Inventors: Magnus Thurfjell, Luleå (SE); Sara Landström, Luleå (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 262 days.

(21) Appl. No.: 14/117,867

(22) PCT Filed: May 17, 2011

(86) PCT No.: PCT/SE2011/050616  
§ 371 (c)(1),  
(2), (4) Date: Nov. 15, 2013

(87) PCT Pub. No.: WO2012/158078  
PCT Pub. Date: Nov. 22, 2012

(65) Prior Publication Data  
US 2015/0162996 A1    Jun. 11, 2015

(51) Int. Cl.  
*H04B 17/00* (2015.01)  
*H04B 17/12* (2015.01)  
*H04B 7/04* (2006.01)  
*H04B 7/10* (2006.01)

(52) U.S. Cl.  
CPC .............. *H04B 17/12* (2015.01); *H04B 7/0417* (2013.01); *H04B 7/10* (2013.01)

(58) Field of Classification Search  
None  
See application file for complete search history.

(56) References Cited

U.S. PATENT DOCUMENTS

| | | | |
|---|---|---|---|
| 6,693,588 B1* | 2/2004 | Schlee | H01Q 3/267 342/165 |
| 2004/0142729 A1* | 7/2004 | Yuda | H01Q 3/267 455/562.1 |
| 2010/0190456 A1 | 7/2010 | Asplund et al. | |
| 2011/0195670 A1* | 8/2011 | Dakshinamurthy | H01Q 3/2647 455/73 |

FOREIGN PATENT DOCUMENTS

| | | |
|---|---|---|
| EP | 0940934 B1 | 8/2004 |
| EP | 2173010 A1 | 4/2010 |
| GB | 2465752 A | 6/2010 |
| WO | 03028153 A1 | 4/2003 |

* cited by examiner

*Primary Examiner* — Ian N Moore  
*Assistant Examiner* — Brian T Le  
(74) *Attorney, Agent, or Firm* — Patent Portfolio Builders, PLLC (57) ABSTRACT

Method and arrangement for supporting calibration of correlated antennas. The method involves determining a timing difference $\tau$ between the correlated antennas based on variations in carrier signal strength over frequency in at least one direction from the correlated antennas and providing the determined timing difference $\tau$ for use in calibration of the correlated antennas.

20 Claims, 9 Drawing Sheets

METHOD AND ARRANGEMENT FOR SUPPORTING CALIBRATION OF CORRELATED ANTENNAS

TECHNICAL FIELD

The invention relates generally to calibration of correlated antennas, and in particular to a method and arrangement for supporting the same.

BACKGROUND

In today's cellular systems the use of multiple antennas (MIMO) for transmission is becoming increasingly important. The antenna system can be designed with either correlated or uncorrelated antenna elements, or combinations thereof where some antenna elements are correlated and others uncorrelated.

Figure 1:
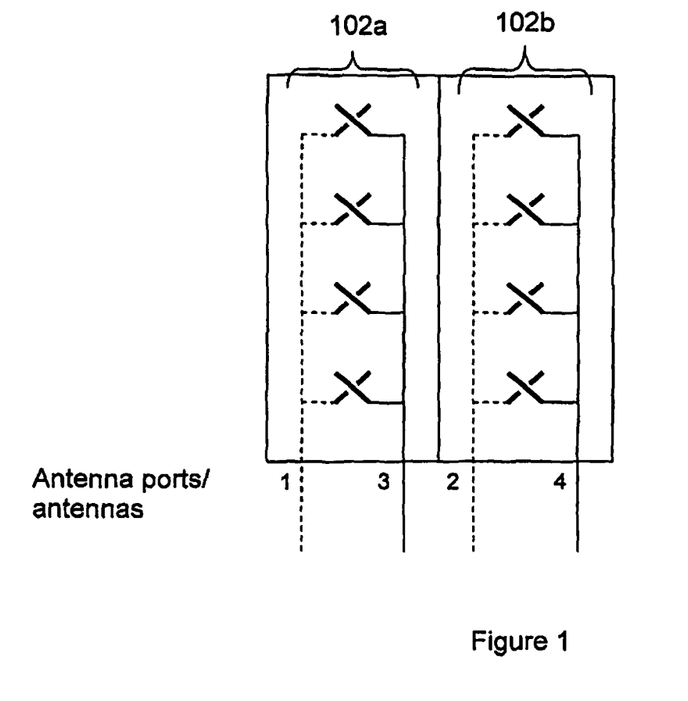
FIG. 1 shows a 4-antenna configuration with 2 closely spaced cross-polarized elements, according to the prior art.

To fully be able to exploit the potential of these MIMO systems the correlated antenna elements need to be calibrated both in phase and amplitude. Antenna calibration is mostly important when an antenna configuration includes correlated antenna elements and for features that require well directed beams. An example of such an antenna configuration is the commonly used 4-antenna configuration with 2 closely spaced cross-polarized elements 102a,102b, which is illustrated in FIG. 1. The cross-polarized elements, or cross-poles, 102a,102b, each comprises two mutually uncorrelated cross-polarized antenna elements, 1+3 (102a) and 2+4 (102b), respectively. The antenna elements 1 and 2 are illustrated as dashed lines, and the antenna elements 3 and 4 are illustrated as solid lines in FIG. 1. The "dashed" antenna elements, 1 and 2 have the same polarization and compose a first pair of correlated antennas. The "solid" antennas, 3 and 4 have the same polarization and compose a second pair of correlated antennas.

One source of error is timing differences between antenna branches due to feeder length differences or delay differences in the radio chains. Most calibration techniques require additional hardware or other adjustments for calibration purpose only, which is expensive and inefficient.

SUMMARY

It would be desirable to calibrate correlated antennas in a simple and efficient manner. It is an object of the invention to enable efficient calibration of correlated antennas. It is further an object of the invention to provide a method and arrangement for supporting calibration of correlated antennas.

According to a first aspect, a method is provided in a network node in a cellular communication system for supporting calibration of a first pair of correlated antennas. The method comprises obtaining information related to a frequency selective carrier signal strength related to radio transmission by the correlated antennas in at least one direction from the correlated antennas. The method further comprises determining a frequency selective carrier signal strength related to radio transmission by the correlated antennas in at least one direction from the correlated antennas, based on the obtained information. Further, the method comprises determining a timing difference $\tau$ between the correlated antennas based on variations in carrier signal strength over frequency in the at least one direction from the correlated antennas, and providing the determined timing difference $\tau$ for use in calibration of the correlated antennas.

According to a second aspect, an arrangement for supporting calibration of a first pair of correlated antennas is provided for use in a network node in a cellular communication system. The arrangement comprises a functional unit adapted to obtain information related to a frequency selective carrier signal strength related to radio transmission by the correlated antennas in at least one direction from the correlated antennas. The arrangement further comprises a functional unit adapted to determine a frequency selective carrier signal strength related to radio transmission by the correlated antennas in at least one direction from the correlated antennas, based on the obtained information. The arrangement is further adapted to determine a timing difference $\tau$ between the correlated antennas based on variations in carrier signal strength over frequency in the at least one direction from the correlated antennas, and further adapted to provide the determined timing difference $\tau$ for use in calibration of the correlated antennas.

The above method and arrangement provide an efficient approach or scheme for supporting calibration of correlated antennas as no additional hardware is required for calibration. Further, no additional dedicated signaling is required in order to performing the suggested method. For example, in LTE, frequency selective CQI (CSI mode 3-1) can be used for estimating a carrier signal strength in a certain direction. Further, the method is well suited for being extended to large bandwidths.

The above method and arrangement may be implemented in different embodiments. In some embodiments the frequency selective carrier signal strength is determined based on frequency selective channel quality reports received from one or more other network nodes. The frequency selective carrier signal strength may also be determined based on information obtained by measurements on signals transmitted by the correlated antennas. The measurements may be performed by the network node in which the method is performed, e.g. by use of remote antennas, or be performed by other network nodes, such as e.g. UEs served by the network node. Some embodiments may involve filtering of obtained information in time, such that the effect of fast fading and interference is reduced.

Further, a delay D may be added to the transmission from one of the antennas, such that at least two frequency intervals, in which the carrier signal strength related to said direction is below a predefined threshold may be identified within the frequency bandwidth used for transmission by the correlated antennas. The distance $\Delta f$ between two such frequency intervals may be estimated and the timing difference $\tau$ between the correlated antennas may then be determined based on the distance $\Delta f$ and the added delay D (if a delay D has been added), e.g. as $\tau = 1/\Delta f - D$.

The predefined threshold may depend on the maximum carrier signal strength over the frequency bandwidth.

When no delay D needs to be added in order to identify at least two frequency intervals, in which the carrier signal strength related to a direction is below a predefined threshold, a test may be performed in order to determine how the correlated antennas should be calibrated in order to eliminate the timing difference $\tau$. Such a test may involve reducing the delay of transmissions from a first one of the correlated antennas by the determined timing difference $\tau$ and determining whether more than one frequency interval in which the carrier signal strength related to one direction is below a predefined threshold can still be identified (If two such frequency intervals can still be identified, the timing difference $\tau$ has been removed from the transmission of the wrong antenna). The correlated antennas may further be calibrated in accordance with the result of the test.

When more than one pair of correlated antennas, e.g. a second pair, is used simultaneously as the first pair of antennas, the effect on the frequency selective carrier signal strength of transmission from the second pair could be mitigated by adding a delay $D_2$, or a corresponding phase difference, to the transmission from one of the antennas in the second pair such that the contribution to carrier signal strength from the transmission on the second pair of correlated antennas will be averaged over a sub-band and equal for all sub-bands within the frequency bandwidth used for transmission on the first pair of correlated antennas. The correlated antennas may be directly or indirectly controlled by the network node.

According to a third aspect, a network node is provided for use in a cellular communication system, said network node comprising an arrangement according to the second aspect.

The embodiments above have mainly been described in terms of a method. However, the description above is also intended to embrace embodiments of the arrangement and network node, adapted to enable the performance of the above described features. The different features of the exemplary embodiments above may be combined in different ways according to need, requirements or preference.

BRIEF DESCRIPTION OF DRAWINGS

The invention will now be described in more detail by means of exemplifying embodiments and with reference to the accompanying drawings, in which:

FIG. 3b shows the received carrier signal strength over frequency in the position of the mobile terminal 302 illustrated in FIG. 3a.

DETAILED DESCRIPTION

Within this disclosure, a suggested scheme for supporting calibration of correlated antennas will be described with reference to the type of antenna arrangement illustrated in FIG. 1. However, it should be noted that the suggested scheme is applicable for calibration of any type of antenna arrangement, which holds at least one group of correlated antenna elements as part of the total antenna arrangement.

For a single pair of correlated antennas, such as e.g. antenna 1 and 2, the main lobe or beam during transmission is pointing in the direction where the phases of the antenna signals are added constructively. By changing the phase of the signal emitted from one of the antennas in the pair, the main lobe direction will change.

Figure 3A:
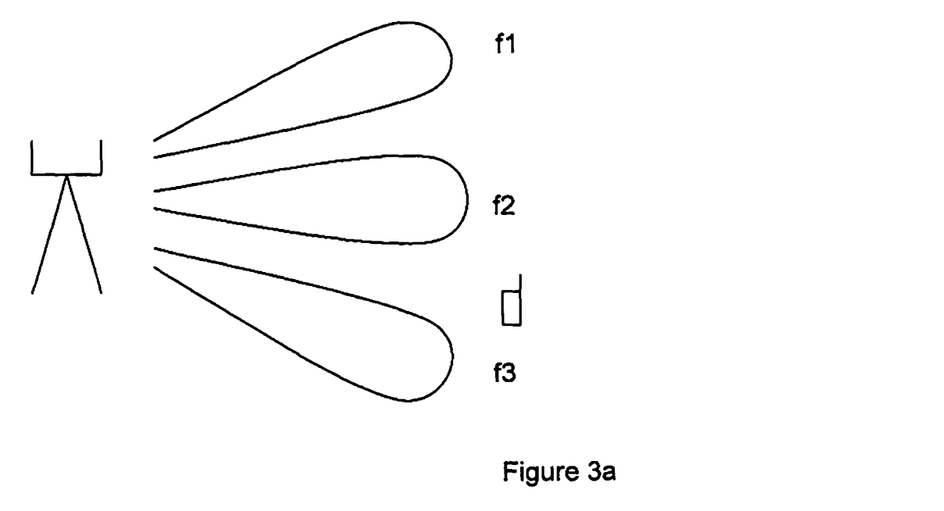
FIG. 3a shows a schematic view of the signal distribution pattern for a transmission over a pair of (uncalibrated) correlated antennas.
Figure 3B:
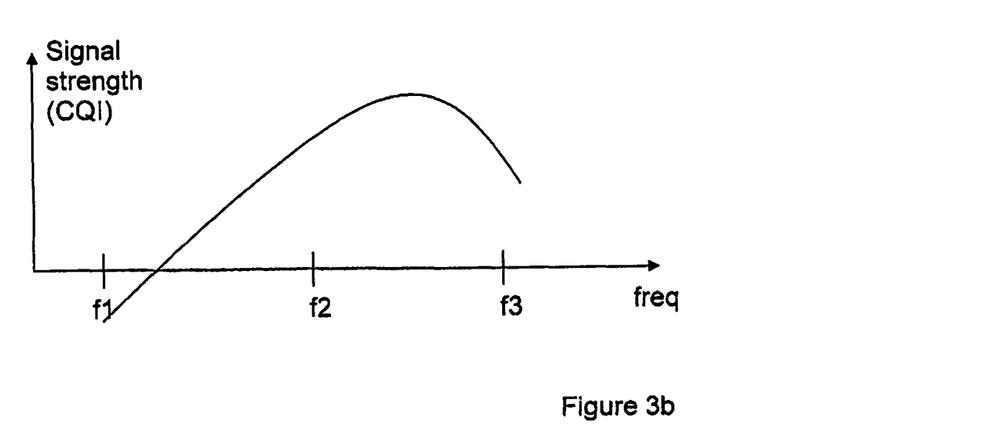

With a timing error between the correlated antennas, this phase shift will be frequency dependent by $\Delta\phi = 2\pi\Delta f\tau$, where $\tau$ is the timing difference between the correlated elements. For example, as illustrated in FIG. 3a-b, in such a case, a UE 302 located at a fixed position may experience constructive addition of the signals (i.e. being in the main lobe) in one part of the frequency band, and experience destructive addition, e.g. a null, in another part of the frequency band.

Figure 2:
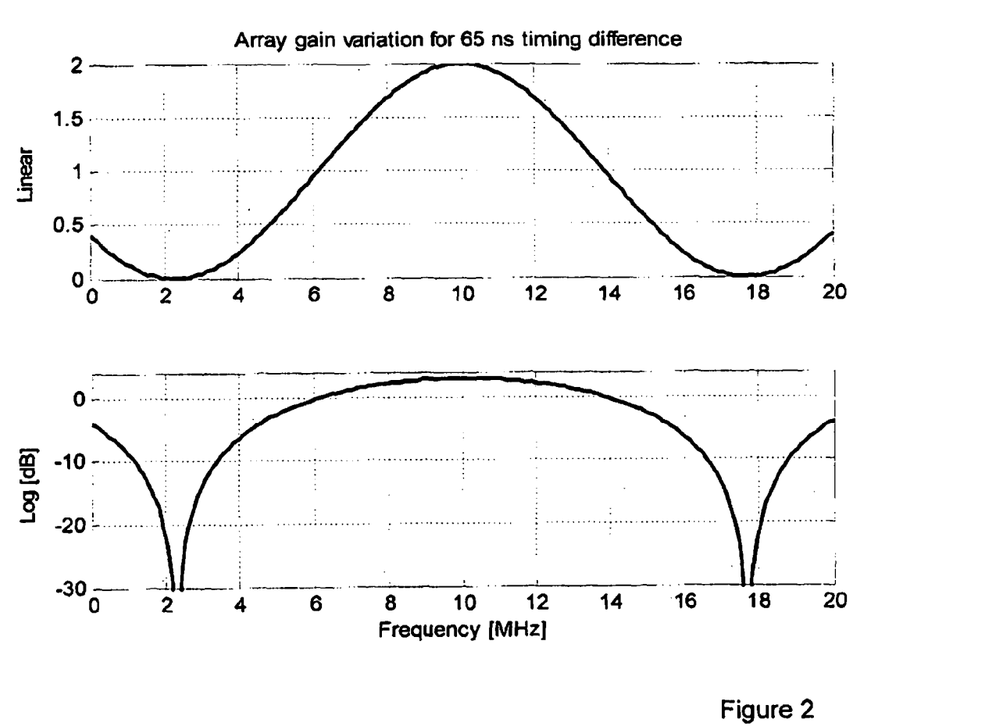
FIG. 2 shows diagrams of the variation in carrier signal strength over frequency for a pair of correlated antennas.

An example illustrated in FIG. 2 shows the variations of the received power of a transmission over a pair of correlated antennas in a certain direction, over a bandwidth of 20 MHz, with a timing difference of 65 ns between the correlated antennas. Note that the transmit weights of any precoder used should be set to be the same over the whole bandwidth of 20 MHz during the suggested procedure. In the example in FIG. 2, it can be seen that the receiver is located in the main lobe at the center frequency, which depends on the antenna phase shift and the direction to the receiver.

The null "positions" or "points", or "dips", mark the frequencies for which the signals from the correlated antennas are added destructively. Hence, the phase difference, $\Delta\phi$, between null positions is $N*2\pi$ (N=1 here). It has now been realized, that the distance in frequency between two consecutive null points is dependent of $\tau$ as $\Delta f = 1/\tau$ and could thus be utilized for estimating the timing difference between the antenna elements in the pair.

When the suggested scheme is performed in the network node which uses the correlated antennas for transmission, the received power, or carrier signal strength, can be estimated based on channel quality reports, e.g. received from one or more UEs served by the network node. Such channel quality reports are typically based on channel quality measurements of the received signal in said UEs. Multiple channel quality values can be reported simultaneously by a UE to the network node, each value reflecting the channel quality over a smaller part or sub-band of the frequency bandwidth or carrier. Such an embodiment could be implemented e.g. in an existing LTE system without requiring any additional hardware or signaling.

Alternatively, or in addition, if the node using the correlated antennas for transmission has one or more remote antennas, which could be used for receiving signals transmitted over the correlated antennas and thus for measuring e.g. the received power of said signals at the remote location. Thus, the carrier signal strength at one or more remote locations could be estimated from measurements performed in the one or more locations/directions using said remote antennas.

Further, when the suggested scheme is performed in a node other than the node using the correlated antennas for transmission, this other node could estimate the received power or carrier signal strength either by access to frequency selective channel quality reports, e.g. CQIs, or, by performing frequency selective measurements of relevant parameters, such as e.g. received signal strength.

Hence, the carrier signal strength could be estimated e.g. based on frequency selective channel quality reports or direct measurements.

However, for a 4 transmit (tx) antenna configuration with two pairs of correlated elements, the channel quality reports associated with transmissions made using said configuration reflect the combination of all four elements, i.e. not only one of the correlated pairs. Such a channel quality report represents the sum of the received power from the two correlated antenna pairs, i.e. antenna 1+2 and 3+4. The relation described in FIG. 2 holds for each of the correlated pairs. The timing difference between elements 1 and 2 is independent of the timing difference between element 3 and 4.

However, by "removing" the signal strength variation between one of the pairs e.g. 3+4 it is possible to achieve a channel quality variation that only represents the timing difference between the other pair of antennas, i.e. 1+2.

Figure 4:
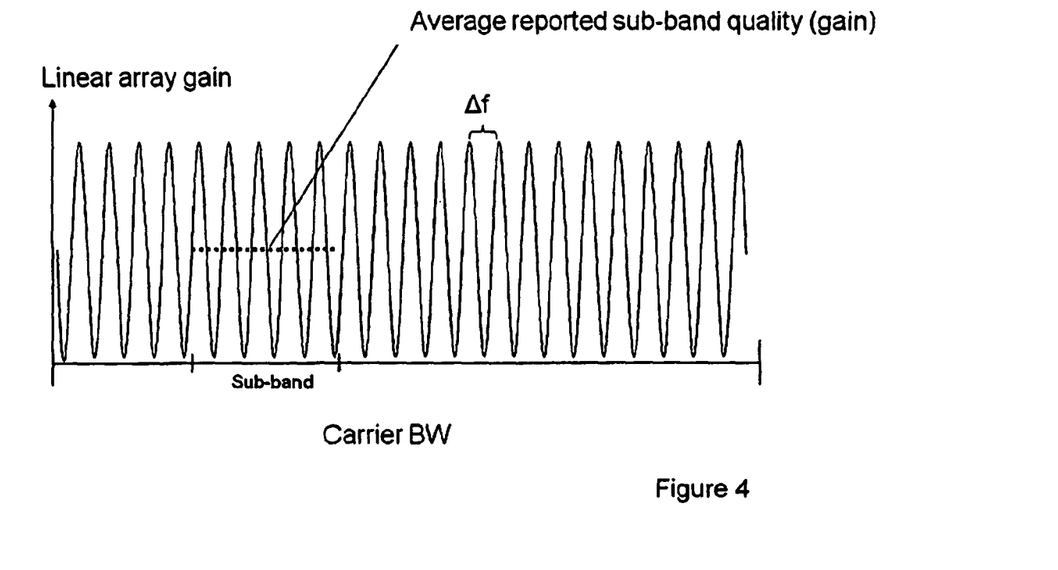
FIG. 4 shows a diagram of the variation in carrier signal strength over frequency for a pair of correlated antennas when a considerable delay $D_2$ has been added to one of the antennas in the pair, according to an exemplifying embodiment.

This "removing" can be achieved by adding an extra delay $D_2$, which is significantly larger than the timing difference between the antennas, to one of the antennas in the pair to be "removed", e.g. 3 or 4, as above. The delay $D_2$ should be large enough to reduce $\Delta f$ significantly below the sub-band BW. The result will be that the channel quality/carrier signal strength contribution from the antenna pair 3+4 on each sub-band will be averaged, and also equal for all sub-bands. This averaging is illustrated in FIG. 4. The remaining channel quality variations can then be assumed to correspond to the timing or delay difference $\tau_1$ between antenna 1 and 2, and could consequently be used for correcting this difference $\tau_1$.

Note that the extra delay $D_2$ also can be added by use of a frequency dependent phase shift of the signal, e.g. to avoid problems with the cyclic prefix length. The delay $D_2$ might be a significant part of the symbol time which introduces extra delay spread of the channel which might exceed the cyclic prefix length. A frequency selective phase shift does not affect the delay spread but has the same required averaging effect.

When the timing difference $\tau_1$ between antenna 1 and 2 is corrected down to close to zero ns, the extra delay $D_2$ can be removed, and the channel quality variations will thus consequently reflect the only remaining timing difference, which is the timing difference $\tau_2$ between antenna 3 and 4.

For smaller delay differences and/or smaller carrier bandwidths, the distance, $\Delta f$, between two consecutive null positions or "dips" may be larger than the carrier bandwidth. When the distance $\Delta f$ is larger than the carrier bandwidth, only one null position, or no null position at all, is located within the carrier bandwidth, which makes it difficult to determine $\Delta f$. However, this can be solved by adding an extra delay D to one of the antennas in the evaluated antenna pair.

For example, if the timing difference $\tau_1$ between antenna 1 and 2 is 10 ns, the distance $\Delta f$ between two null positions would be 100 MHz, and thus impossible to detect within a 20 MHz carrier bandwidth. However, if e.g. an extra delay D of 100 ns is added to one of the antennas 1 or 2, $\Delta f$ will be reduced to ~9.1 MHz (or ~11.1 MHz depending on to which antenna the extra delay D is added), which can be detected within a carrier bandwidth of 20 MHz. The extra delay D is then simply subtracted from the result to derive the timing difference $\tau_1$.

Further, in order to correctly compensate for the determined timing difference, the "sign" of the timing difference should be determined. That is, it should be determined which of the antennas in the correlated pair that emits a signal which is delayed in relation to the signal emitted by the other antenna in the pair. This could be managed by testing, which will be further described below. There are only two alternatives.

Below, exemplifying embodiments will be described. First, two embodiments will be described in pseudo code. The following definitions will be used in the examples:

$\Delta f_{sb}$=The granularity of the channel quality reports in frequency (the width of a sub-band)
$\Delta f_c$=The bandwidth of the system
$\tau$=Timing delay
$\Delta f$=The distance between two dips in the frequency domain
$\tau_{extra}$=Extra delay added for finding the timing error
$\tau_{tot}=(N^*)\tau_{extra+}\tau$ Exemplifying Procedure for Calibration of One Pair of Correlated Antennas.

For the case with only two correlated elements, or two cross-poles with only one of the correlated pairs activated, i.e. resembling a 2-antenna case.

1 Configure frequency selective channel quality reporting with sub-band size $\Delta f_{sb}$;
2 Filter channel quality reports in time to reduce fast fading and interference impact;
3 Find dips or minimum values over the carrier frequency bandwidth;
4 Set N=0;
5 While(dips<=1) found;
6 N=N+1;
7 Add an extra delay $N^*\tau_{extra}$, where $\tau_{extra}=2/\Delta fc$ to antenna 1;
8 End (while);
9 Estimate the distance $\Delta f$ between two consecutive dips;
10 Calculate a corresponding delay $\tau_{tot}=1/\Delta f$;
11 Compute the timing delay $\tau=\tau_{tot}-N^*\tau_{extra}$;
12 Reduce the delay on antenna 1 by $\tau$, or alternatively increase delay on antenna 2 by $\tau$;
13 If N=0 and dips>1;
14 Undo 12 and reduce the delay on antenna 2 by $\tau$, or alternatively increase delay on antenna 1 by $\tau$;
15 End (If);

Exemplifying procedure for calibration of two pairs of correlated antennas

For the case of a 4 tx antenna configuration with 2 closely spaced cross-polarized elements (XX)(cf. 102a and 102b in FIG. 1), comprising two pairs of correlated co-polarized antenna elements (cf. antenna elements 1-4 in FIG. 1). This procedure comprises removing the influence of one of the correlated antenna pairs (3+4) and calibrating the other pair (1+2)

1 Calculate a delay $\tau$ ($D_2$) representing a 360 deg phase shift on e.g. ⅒ of the sub-band width, by $\tau=10/\Delta f_{sb}$, where $\Delta f_{sb}$ is the sub-band size.
2 Add the delay $\tau$ ($D_2$) or the equivalent frequency dependent phase shift to antenna number 3 (to average out the contribution of antennas 3 and 4).
3 Configure frequency selective channel quality reporting with sub-band size $\Delta f_{sb}$;
4 Filter channel quality reports in time to reduce fast fading and interference impact;
5 Find dips or minimum values over the carrier frequency bandwidth;
6 Set N=0;
7 While(dips<=1) found;
8 N=N+1;
9 Add an extra delay $N^*\tau_{extra}$, where $\tau_{extra}=2/\Delta fc$ to antenna 1;
10 End (while);
11 Estimate the distance $\Delta f$ between two consecutive dips;
12 Calculate a corresponding delay $\tau_{tot}=1/\Delta f$;
13 Compute the timing delay $\tau=\tau_{tot}-N^*\tau_{extra}$;
14 Reduce the delay on antenna 1 by $\tau$, or alternatively increase delay on antenna 2 by $\tau$;
15 If N=0 and dips>1;
16 Undo 12 and reduce the delay on antenna 2 by $\tau$, or alternatively increase delay on antenna 1 by $\tau$;
17 End (If);
18 Remove $\tau$ from antenna 3.
19 Do actions 3-17 again but switch antenna 1 for antenna 3 and switch antenna 2 for antenna 4 in the procedure.

Exemplifying Procedures. FIG. 5-8

Below, exemplifying embodiments of the procedure for supporting calibration of a first pair of correlated antennas will be described with reference to FIGS. 5-8. The procedure(s) could be performed in a network node which is associated with or directly controls the correlated antennas to be calibrated, i.e. a node that uses the correlated antennas for transmission, such as e.g. an eNB or similar. Alternatively, the procedure could be performed in a network node which is not associated with or directly controls the correlated antennas, i.e. a node which does not use the correlated antennas for transmission, such as e.g. a mobile terminal or an OAM (Operations, Administration & Maintenance) node.

Figure 5:
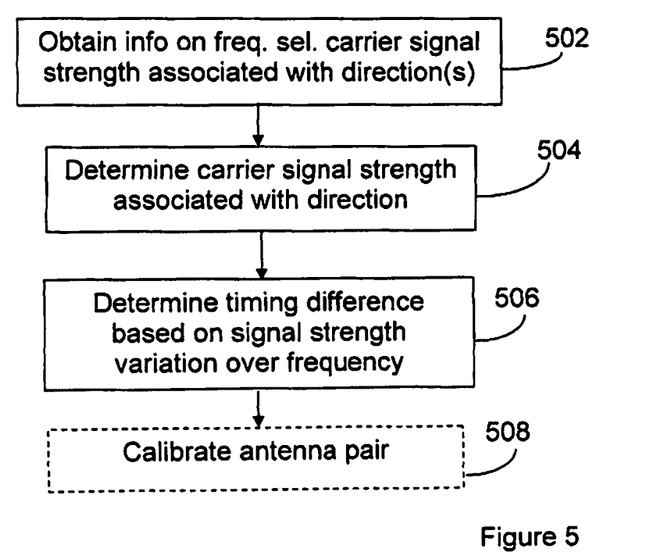
FIGS. 5-8 are flow charts illustrating procedures according to exemplifying embodiments.

In general, as illustrated in FIG. 5, information related to a frequency selective carrier signal strength for radio transmission by the correlated antennas in at least one direction is obtained in an action 502. The information could be channel quality reports received from other nodes, or the result of measurements received or retrieved from another node or performed within the network node.

Further, a frequency selective carrier signal strength related to radio transmission by the correlated antennas in at least one direction from the correlated antennas is determined in an action 504. The frequency selective carrier signal strength is determined based on the obtained information. A timing difference τ between the correlated antennas is determined in an action 506, based on variations in carrier signal strength over frequency in the at least one direction from the correlated antennas. The determined timing difference τ is then provided for use in calibration of the correlated antennas. The correlated antennas may be calibrated by subtracting the timing difference τ from transmissions on one of the antennas in the correlated pair. When the procedure is performed in another node than the network node associated with the correlated antennas, the timing difference τ is instead provided or indicated to the node associated with the correlated antennas; possibly together with a calibration order or instruction.

Figure 6:
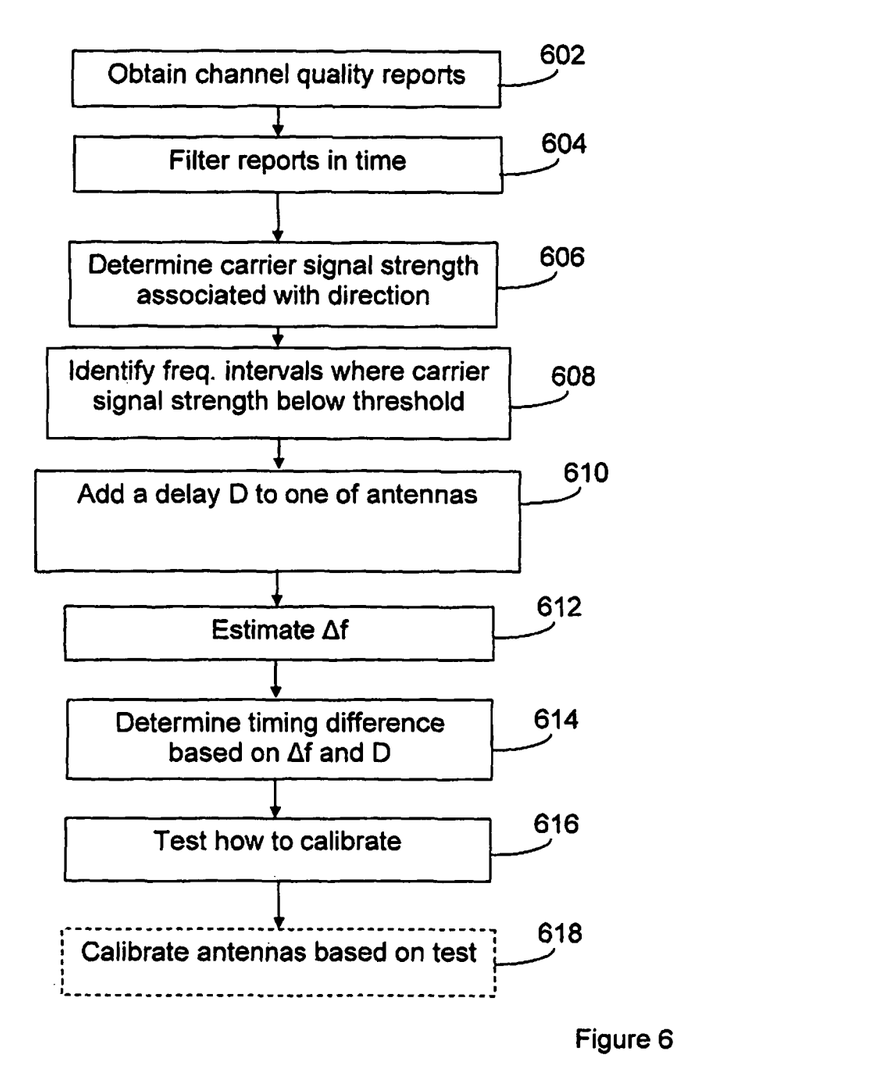

A more detailed exemplifying procedure is illustrated in FIG. 6. Frequency selective channel quality reports, such as e.g. CQIs, associated with one or more directions from the correlated antennas, may be received or retrieved from one or more other nodes in an action 602. The received reports may then be filtered in time in an action 604, such that the effect of fast fading and interference is reduced. The carrier signal strength over frequency in one or more directions from the correlated antennas may then be determined in an action 606, based on the filtered channel quality reports. Alternatively, or in addition, measurements may be performed on signals transmitted by the correlated antennas in one or more directions. The information obtained by performing said measurements could also be filtered in time to reduce the effect of fast fading and interference.

Further, frequency intervals in which the carrier signal strength related to one direction is below a predefined threshold may be identified in an action 608. If necessary, a delay D could be added to the transmission from one of the antennas in an action 610, such that at least two "dips" or frequency intervals in which the carrier signal strength related to said direction is below the predefined threshold, can be identified within the frequency bandwidth used for transmission by the correlated antennas. That is, such that at least two "dips" can be identified within the bandwidth in question, e.g. the carrier bandwidth. When the procedure is performed in a node other than the node associated with the correlated antennas, said other node may induce or order the node associated with the correlated antennas to add the delay D in a corresponding way. The predefined threshold could preferably e.g. be defined in relation to the maximum carrier signal strength over the frequency bandwidth in question.

When at least two "dips" can be identified within the frequency bandwidth in question, the distance Δf between two consecutive "dips" may be estimated in an action 612. Then, the timing difference τ between the correlated antennas may be determined in an action 614, based on the estimated distance Δf and the added delay D (if any), such as τ=1/Δf−D.

When two dips may be identified within the frequency bandwidth without the addition of any delay D, it may be ambiguous how the correlated antennas should be calibrated to eliminate the determined timing difference τ. In order to determine how the correlated antennas should be calibrated a test could be performed in an action 616. Such a test will now be described in further detail below with reference to FIG. 7.

When the timing difference between a pair of correlated antennas has been determined in an action 702 (without the addition of a delay D), and the antenna pair should be correlated, a test could be performed, to ensure correct calibration of the correct antenna element. The test may involve reducing the delay of transmission from a first one of the correlated antennas by the determined timing difference τ, in an action 704. Further, after reducing said delay, it may be determined in an action 706 whether (or not) two or more dips can still be identified within the frequency bandwidth in question. If two or more dips can still be identified, it may be concluded that the reduction of the determined timing difference τ has been applied to the wrong antenna, and thus that it is instead the delay of transmissions from the second one of the correlated antennas that should be reduced by the timing difference τ, in order to achieve correct calibration. This alternative is illustrated by action 710 in FIG. 7. If less than two dips can be identified, the determined timing difference τ has been applied to the right antenna and the correct calibration may thus be performed by "confirming" or "prolonging", the reduction of delay of transmission from the first antenna in an action 708.

Figure 7:
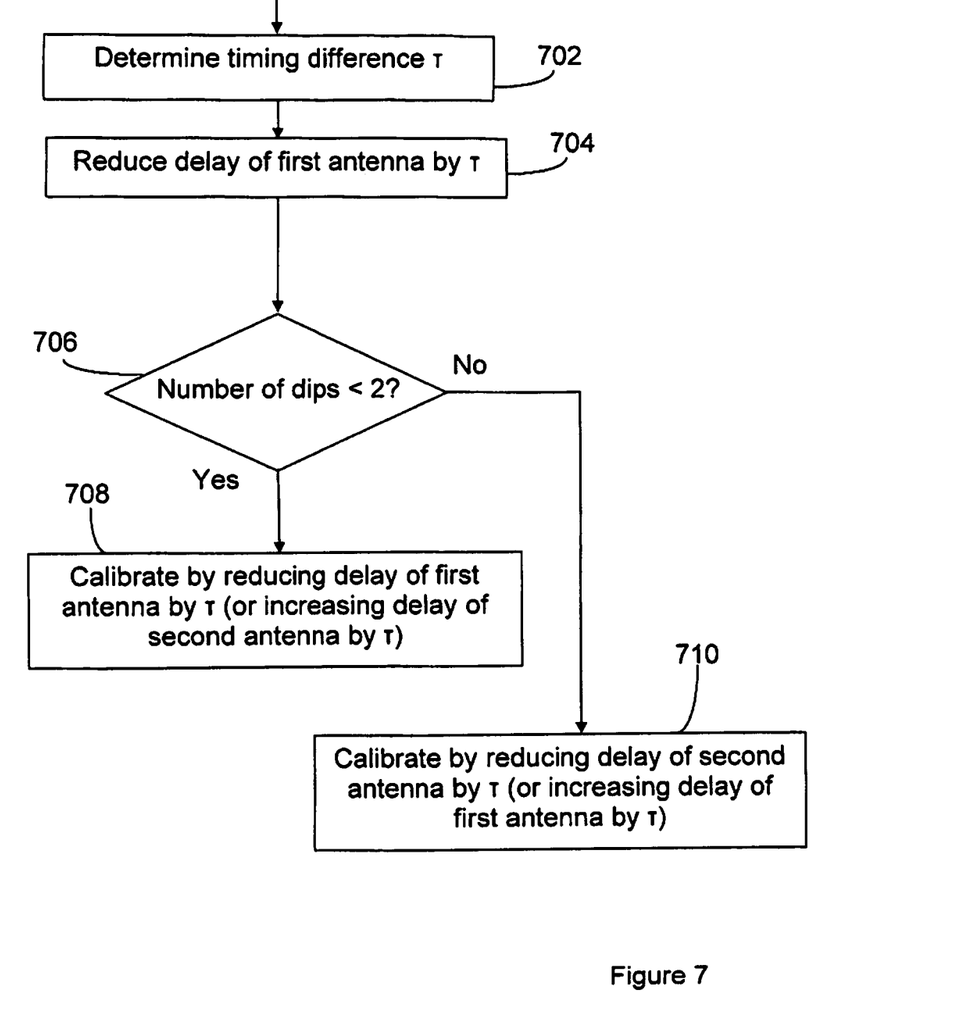

Alternatively, if the reduction of the delay of transmission from the first one of the correlated antennas was just temporary for the duration of the test, the calibration may involve that the delay of transmission from the first antenna is reduced by said timing difference τ "again" in said action 708.

Figure 8:
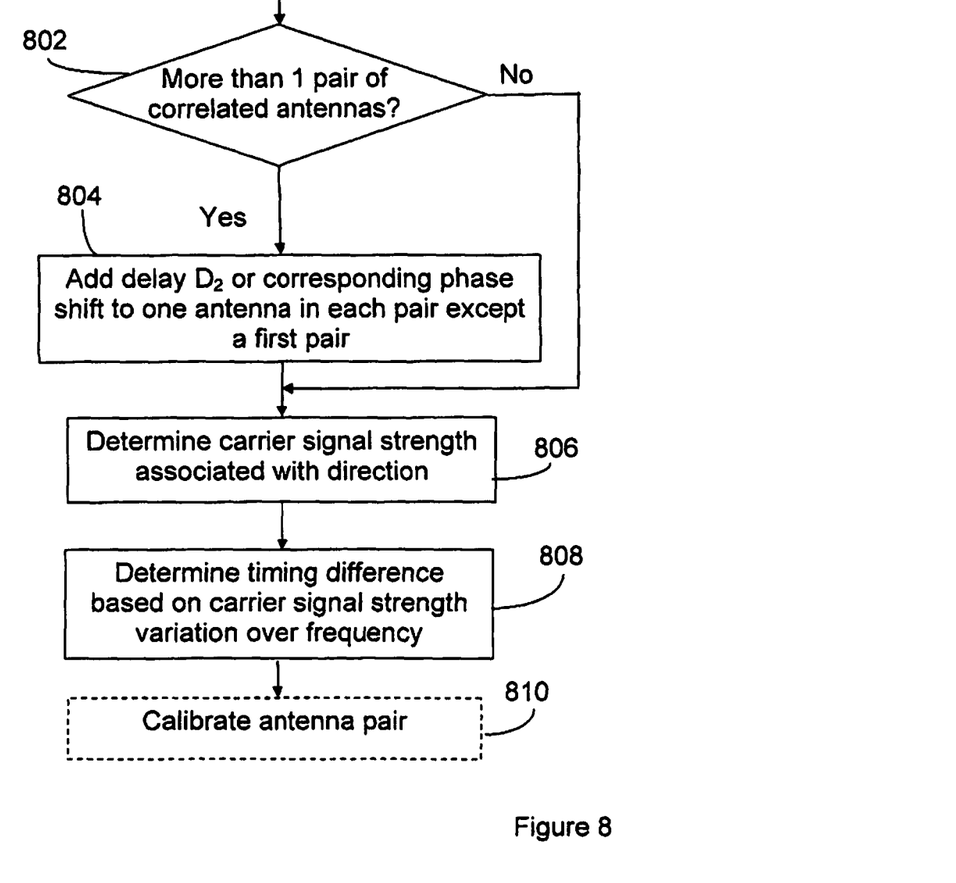

As previously described, more than one pair of correlated antennas may be used simultaneously during transmission, such as e.g. when using an antenna arrangement as the one illustrated in FIG. 1. The variation over frequency of the measured or estimated carrier signal strength in a direction from the antennas then depends on the timing difference between the correlated antennas in each pair. An exemplifying procedure for use in such a case is illustrated in FIG. 8. Initially, it is determined in an action 802, whether more than one pair of correlated antennas are used for transmission. If only one pair of correlated antennas is used for transmission, the procedure is performed as previously described in conjunction e.g. with FIG. 5.

However, when it is determined that more than one pair of correlated antennas are used for transmission, the effect on the variation over frequency of the measured or estimated carrier signal strength in a direction from the antennas of all pairs but one should be mitigated or eliminated. This could be done in an action 804, by adding a delay $D_2$ to the transmissions from one of the antennas in each pair for which the effect on the variation over frequency should be mitigated or removed (cf. FIG. 4). $D_2$ should be selected such that the distance Δf associated with transmissions from the respective pairs of correlated antennas is much shorter, e.g. 1/10 (1/5 in FIG. 4), than the width of a frequency sub-band, such that the variation over frequency of the measured or estimated carrier signal strength in a direction from the antennas is "averaged out" or neutralized for each of the correlated antenna pairs over each and every frequency sub-band. The delay $D_2$ does not need to be equally long for the different antenna pairs.

Then, the carrier signal strength in one or more directions could be determined for the single "remaining" pair of correlated antennas in an action 806, since, if having selected $D_2$ properly, the variation over frequency of the measured or estimated carrier signal strength in a direction from the antennas will only, or at least mainly, depend on the timing difference between this single remaining pair. The procedure may then proceed, as previously described, with determining the timing difference between the antenna elements of the "remaining" antenna pair based on carrier signal strength variation over frequency in an action 808, etc.

Figure 9:
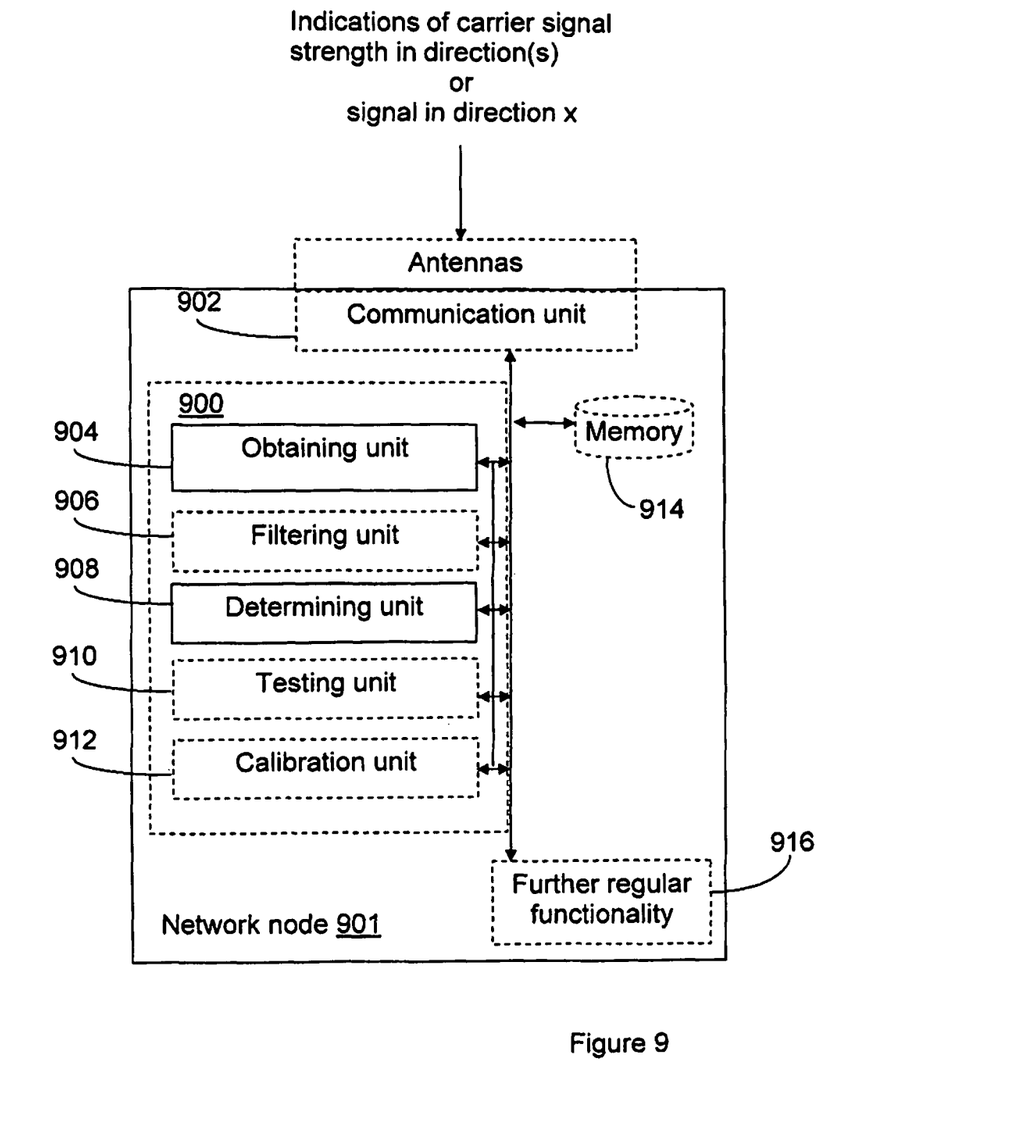
FIG. 9 is block diagrams illustrating arrangements, according to exemplifying embodiments

Exemplifying Arrangement. FIG. 9

Below, an example arrangement 900, adapted to enable the performance of the above described procedure(s) for supporting calibration of a pair of correlated antennas will be described with reference to FIG. 9. The arrangement is suitable for use in a network node and is illustrated as being located in a network node 901 in FIG. 9. The network node could be e.g. an eNB or similar, a mobile terminal, or an OAM node in a communication system. The arrangement 900 is further illustrated as to communicate with other entities via a communication unit 902 which may be considered to comprise conventional means for wireless and/or wired communication. The arrangement or receiving node may further comprise other functional units 916, such as e.g. functional units providing regular eNB or mobile terminal functions, and may further comprise one or more storage units 914.

In a preferred embodiment, the arrangement is adapted for use in a network node which directly controls the correlated antennas which are to be calibrated. The arrangement could also be adapted for use in another node, which does not directly control the correlated antennas to be correlated, as previously described. The actions of reducing or adding a delay and calibrating the antennas would then be performed by inducing the node controlling the antennas to perform said actions in an explicit or implicit manner, e.g. by communicating suitable correction factors or delays, D, to said node.

The arrangement 900 could be implemented e.g. by one or more of: a processor or a micro processor and adequate software, a Programmable Logic Device (PLD) or other electronic component(s).

The arrangement 900 may comprise an obtaining unit 904, which is adapted to obtain information related to a frequency selective carrier signal strength related to radio transmission by the correlated antennas in at least one direction from the correlated antennas. The information could be e.g. frequency selective channel quality reports received from one or more other nodes, and/or, the result of measurements performed on signals transmitted by the correlated antennas. The arrangement may further comprise a filtering unit 906, which is adapted to filter the obtained information time, such that the effect of fast fading and interference is reduced.

The arrangement comprises a determining unit 908, which is adapted to determine a frequency selective carrier signal strength related to radio transmission by the correlated antennas in at least one direction from the correlated antennas, based on the obtained information. The determining unit 908 is further adapted to determine a timing difference τ between the correlated antennas based on variations in carrier signal strength over frequency in the at least one direction from the correlated antennas, and further adapted to provide the determined timing difference τ for use in calibration of the correlated antennas.

While the method and arrangement for supporting calibration of a first pair of correlated antennas as suggested above has been described with reference to specific embodiments provided as examples, the description is generally only intended to illustrate the inventive concept and should not be taken as limiting the scope of the suggested methods and arrangements, which are defined by the appended claims. While described in general terms, the method and arrangement may be applicable e.g. for different types of communication systems, using commonly available communication technologies using correlated antennas, such as e.g. WCDMA, LTE, LTE-A, WiMAX (Worldwide Interoperability for Microwave Access), GSM, UMTS, satellite systems or broadcast technologies.

It is also to be understood that the choice of interacting units or modules, as well as the naming of the units are only for exemplifying purpose, and nodes suitable to execute any of the methods described above may be configured in a plurality of alternative ways in order to be able to execute the suggested process actions.

It should also be noted that the units or modules described in this disclosure are to be regarded as logical entities and not with necessity as separate physical entities.

The invention claimed is:

1. A method in a network node in a cellular communication system for supporting calibration of a first pair of correlated antennas, the method comprising:
  obtaining information related to a frequency selective carrier signal strength related to radio transmission by the first pair of correlated antennas in at least one direction from the first pair of correlated antennas,
  determining the frequency selective carrier signal strength related to the radio transmission by the first pair of correlated antennas in at least one direction from the first pair of correlated antennas, based on the obtained information,
  determining a timing difference τ between the first pair of correlated antennas based on variations in carrier signal strength over frequency in the at least one direction from the first pair of correlated antennas, and
  providing the determined timing difference τ for use in calibration of the first pair of correlated antennas,
  wherein the determining of the timing difference between the first pair of correlated antennas involves:
  identifying frequency intervals in which the carrier signal strength related to the at least one direction is below a predefined threshold,
  adding a delay D to the radio transmission from one of the first pair of correlated antennas, whereby at least two frequency intervals, in which the carrier signal strength related to said at least one direction is below the predefined threshold, are identified within a frequency bandwidth used for the radio transmission by the first pair of correlated antennas,
  estimating a distance Δf between two consecutive frequency intervals of said at least two frequency intervals, and
  determining the timing difference τ between the first pair of correlated antennas based on the distance Δf and the added delay D.

2. The method according to claim 1, wherein the obtained information on the frequency selective carrier signal strength comprises one or more of:
  frequency selective channel quality reports received from one or more other network nodes, related to the radio transmission by the first pair of correlated antennas in the at least one direction from the first pair of correlated antennas, and
  information obtained by measurements on signals transmitted by the first pair of correlated antennas in the at least one direction.

3. The method according to claim 1, further comprising:
  filtering the obtained information in time, whereby an effect of fast fading and interference is reduced.

4. The method according to claim 1, wherein the predefined threshold depends on a maximum carrier signal strength over the frequency bandwidth.

5. The method according to claim 1, wherein the timing difference τ is determined as: τ=1/Δf−D.

6. The method according to claim 1, further comprising performing a test to determine how the first pair of correlated antennas are calibrated in order to eliminate the timing difference τ.

7. The method according to claim 6, wherein the test involves:
   reducing a delay of transmissions by one of the first pair of correlated antennas by the determined timing difference τ,
   determining whether more than one frequency interval in which the carrier signal strength related to one direction is below a predefined threshold is identified within a frequency bandwidth used for transmission by the first pair of correlated antennas, and
   determining which one of the first pair of correlated antennas is calibrated by the determined timing difference τ based on a result of the test.

8. The method according to claim 6, further comprising calibrating the first pair of correlated antennas in accordance with the result of the test.

9. The method according to claim 1, further comprising mitigating an effect on the frequency selective carrier signal strength of transmission from a second pair of correlated antennas by adding a delay D2, or a corresponding phase difference, to the transmission from one of the correlated antennas in the second pair, whereby the contribution to carrier signal strength from the transmission on the second pair of correlated antennas is averaged over a sub-band and equal for all sub-bands within a frequency bandwidth used for the radio transmission on the first pair of correlated antennas.

10. The method according to claim 1, wherein the first pair of correlated antennas are directly controlled by the network node.

11. The method according to claim 1, wherein the first pair of correlated antennas are indirectly controlled by the network node.

12. A network node in a cellular communication system, for supporting calibration of a first pair of correlated antennas, the network node comprising:
   a processor;
   a memory in communication with the processor, said memory comprising a plurality of units, the plurality of units comprising:
   an obtaining unit, configured to obtain information related to a frequency selective carrier signal strength related to radio transmission by the first pair of correlated antennas in at least one direction from the first pair of correlated antennas, and
   a determining unit, configured to determine the frequency selective carrier signal strength related to the radio transmission by the first pair of correlated antennas in at least one direction from the first pair of correlated antennas, based on the obtained information,
   said determining unit further configured to determine a timing difference τ between the first pair of correlated antennas based on variations in carrier signal strength over frequency in the at least one direction from the first pair of correlated antennas, and further configured to provide the determined timing difference τ for use in calibration of the first pair of correlated antennas,
   wherein said network node is further configured to:
   identify frequency intervals in which the carrier signal strength related to the at least one direction is below a predefined threshold,
   add a delay D to the radio transmission from one of the first pair of correlated antennas, whereby at least two frequency intervals, in which the carrier signal strength related to the at least one direction is below the predefined threshold, are indentified within a frequency bandwidth used for radio transmission by the first pair of correlated antennas,
   estimate a distance Δf between two consecutive frequency intervals of said at least two frequency intervals, and
   determine the timing difference τ between the first pair of correlated antennas based on the distance Δf and the added delay D.

13. The network node according to claim 12, further configured to estimate the frequency selective carrier signal strength based on information related to a frequency selective channel quality related to the radio transmission by the first pair of correlated antennas in the at least one direction from the first pair of correlated antennas, and/or based on information related to measurements on signals transmitted by the first pair of correlated antennas in the at least one direction.

14. The network node according to claim 12, wherein the obtaining unit is configured to one or more of:
   receive frequency selective channel quality reports from one or more other network nodes, related to the radio transmission by the first pair of correlated antennas in the at least one direction from the first pair of correlated antennas, and
   receive the results of measurements performed on signals transmitted by the first pair of correlated antennas in the at least one direction.

15. The network node according to claim 12, further comprising a filtering unit, configured to filter the obtained information in time, whereby an effect of fast fading and interference is reduced.

16. The network node according to claim 12, further comprising a testing unit configured to perform a predefined test for determining how the first pair of correlated antennas are be calibrated in order to eliminate the timing difference τ.

17. The network node according to claim 16, wherein the testing unit is configured to:
   reduce a delay of transmissions by one of the first pair of correlated antennas by the determined timing difference τ,
   determine whether more than one frequency interval in which the carrier signal strength related to one direction is below a predefined threshold is identified within a frequency bandwidth used for transmission by the first pair of correlated antennas, and
   determine which one of the first pair of correlated antennas is calibrated by the determined timing difference τ based on a result of the predefined test.

18. The network node according to claim 16, further comprising a calibrating unit, configured to calibrate the first pair of correlated antennas in accordance with a result of the predefined test.

19. The network node according to claim 12, further configured to add a delay D2, or a corresponding phase difference, to transmission from one of correlated antennas in a second pair of correlated antennas, whereby the contribution to carrier signal strength from the transmission on the second pair of correlated antennas is averaged over a sub-band and equal for all sub-bands within a frequency bandwidth used for the radio transmission on the first pair of correlated antennas.

20. The network node according to claim 12, wherein the network node includes the first pair of correlated antennas.

* * * * *